United States Patent [19]

Maltby, Jr. et al.

[11] Patent Number: 5,156,664
[45] Date of Patent: Oct. 20, 1992

[54] DELIVERY APPARATUS FOR NEWLY FORMED GLASS SHEET STRIP

[75] Inventors: Robert E. Maltby, Jr., Wayne; Michael J. Vild, Toledo, both of Ohio

[73] Assignee: Glasstech, Inc., Perrysburg, Ohio

[21] Appl. No.: 828,208

[22] Filed: Jan. 30, 1992

Related U.S. Application Data

[63] Continuation-in-part of Ser. No. 671,502, Mar. 19, 1991, Pat. No. 5,090,987.

[51] Int. Cl.$^5$ .................................................. C03B 18/02
[52] U.S. Cl. .................................. 65/182.2; 65/182.3; 65/253
[58] Field of Search .............. 65/182.1, 182.2, 182.3, 65/100, 99.2, 253

[56] References Cited

U.S. PATENT DOCUMENTS

| | | | |
|---|---|---|---|
| 1,828,832 | 10/1931 | Drake . | |
| 3,137,556 | 6/1964 | Badger et al. | 65/182 |
| 3,223,506 | 12/1965 | Wheeler | 65/182.2 X |
| 3,300,291 | 1/1967 | Misson | 65/182.2 X |
| 3,407,011 | 10/1968 | Zeidler | 65/253 X |
| 3,506,422 | 4/1970 | Walters | 65/182.2 X |
| 3,885,943 | 5/1975 | Chui | 65/97 |
| 3,930,825 | 1/1976 | Chui | 65/62 |
| 4,081,260 | 3/1978 | Glikman et al. . | |
| 4,343,395 | 8/1982 | Lippert et al. | 65/253 X |
| 4,548,636 | 10/1985 | Nomaki et al. | 65/99.2 |

*Primary Examiner*—Robert L. Lindsay
*Attorney, Agent, or Firm*—Brooks & Kushman

[57] ABSTRACT

Apparatus (20) for delivering a newly formed floating glass sheet from a molten metal bath container (22) includes a topside support device (45) located adjacent the delivery end of the bath container and having a downwardly facing surface (80) with a first set of openings (82) through which a vacuum is drawn and a second set of openings (84) through which pressurized gas is supplied to support the glass sheet strip upon delivery from the molten metal bath (24). The bath container (22) with which the apparatus is disclosed as being used has a linear induction motor (24) that permits horizontal delivery without bath overflowing. The apparatus (20) also includes a gas support (34) and a drive roll (42) that cooperate with each other. The gas support (34) supports the horizontally delivered glass sheet strip by upwardly directed pressurized gas delivered between lateral edge portions (38) of the strip at a location immediately adjacent the bath container (22). The drive roll (42) is located downstream from the molten metal bath (24) and has spaced drive portions (44) that rotatively drive the lateral edge portions (38) of the glass sheet strip without the drive roll engaging the strip between the spaced drive portions. Gas support (34) preferably includes a first manifold (46) that supplies an upwardly directed inert gas and also preferably includes a second manifold (50) that supplies products of combustion from a gas burner for recirculating flow.

14 Claims, 5 Drawing Sheets

DELIVERY APPARATUS FOR NEWLY FORMED GLASS SHEET STRIP

CROSS REFERENCE TO RELATED APPLICATION

This application is a continuation-in-part of prior application Ser. No. 671,502 filed on Mar. 19, 1991 by Robert E. Maltby, Jr., and entitled Apparatus For Delivering Newly Formed Glass Sheet Strip now U.S. Pat. No. 5,090,987.

TECHNICAL FIELD

This invention relates to apparatus for delivering a newly formed floating glass sheet strip from a molten metal bath within a bath container to an annealing lehr where the strip is annealed.

BACKGROUND ART

Glass sheet strip forming has previously been done by both vertical and horizontal processing. In the vertical method such as disclosed by U.S. Pat. Nos. 1,828,832 Drake and 3,137,556 Badger et al, a molten glass strip is pulled upwardly and then turned approximately 90° over a horizontally extending roll so as to be delivered horizontally. In the horizontal method, a glass sheet strip is floated on a molten metal bath, normally tin, prior to movement upwardly out of the bath for delivery therefrom on rolls in a horizontal direction as disclosed by Chui U.S. Pat. Nos. 3,885,943 and 3,930,825. With both the vertical and horizontal glass sheet strip forming processes, it is thus necessary for the glass sheet strip to pass over a roll in its hot condition just after forming which is a disadvantage because the roll thus engages the hot glass when it is relatively soft and thereby reduces its optical quality and mechanical strength. More specifically, the vertical process requires the glass to pass over a roll in order to turn 90° for horizontal delivery as mentioned above, and the horizontal process requires the glass sheet to be bent upwardly by a roll so as to be delivered above an adjacent wall of the molten metal bath which is necessary in order to prevent the molten metal bath from spilling out adjacent the edge of the bath where the hot glass sheet strip is delivered.

In order to provide better quality glass, the horizontally float glass processing as disclosed by U.S. Pat. Nos. 4,081,260 Glikman et al and 4,548,636 Nomaki et al have utilized linear induction motors that exert an electromagnetic induction to the molten metal of the bath adjacent the edge thereof so that the glass sheet strip can remain horizontal adjacent the extremity of the bath without the molten metal spilling out of the bath container. In the U.S. Pat. No. 4,081,260 Glikman et al patent, the hot glass sheet strip is bent slightly upwardly adjacent the extremity of the bath container where inductors are located and is then supported by a device having nozzles for forming a gas cushion that delivers the hot glass sheet strip to an annealing kiln or lehr. In the U.S. Pat. No. 4,548,636 Nomaki et al patent, the side walls of the bath container are disclosed as being made of an electrically conductive material so as to maintain a uniform distribution of electromagnetic force applied to the molten metal bath across the width of the bath container extremity where the glass sheet strip is delivered horizontally outwardly from the bath container.

DISCLOSURE OF INVENTION

An object of the present invention is to provide improved apparatus for delivering a newly formed floating glass sheet strip from a molten metal bath.

In carrying out the above and other objects of the invention, the apparatus of this invention is constructed to deliver a newly formed floating glass sheet strip from a molten metal bath container to an annealing lehr where the strip is annealed. The apparatus includes a topside support device located above the molten metal bath and having a downwardly facing surface including a first set of openings through which a vacuum is drawn to support the glass sheet strip. This downwardly facing surface of the topside support device also has a second set of openings through which pressurized gas is supplied to space the glass sheet strip from the downwardly facing surface such that the vacuum drawn and pressurized gas cooperatively support the glass sheet strip without direct contact therewith for horizontal delivery from the molten metal bath.

In the preferred embodiment disclosed, the bath container with which the apparatus is utilized includes a linear induction motor that permits the glass sheet strip to move horizontally from the molten metal bath without the bath overflowing the bath container. The apparatus also includes a gas support for supporting the horizontally delivered glass sheet strip by upwardly directed pressurized gas delivered between lateral edge portions of the strip at a location immediately adjacent the bath container. A drive means of the apparatus is located downstream from the molten metal bath and is embodied by a drive roll having spaced drive portions that rotatively drive the lateral edge portions of the glass sheet strip without the drive roll engaging the strip between the spaced drive portions. This construction permits the hot glass sheet to be supported at its edge portions without marking the center of the glass where the gas support prevents sagging of the glass sheet between the drive portions.

The bath container with which the apparatus is utilized also includes an upper housing that encloses the molten metal bath which is tin. The gas support of the apparatus is disclosed as including a first manifold having an inert gas supply for supplying an upwardly directed inert gas that supports the glass sheet strip adjacent the bath container while supplying inert gas to the upper housing of the bath container in order to prevent forming of tin oxides. The gas support also preferably includes a second manifold for supplying upwardly directed pressurized gas that supports the glass sheet strip downstream from the first manifold. The inert gas supply as disclosed feeds hot nitrogen to the first manifold and the second manifold preferably includes a gas burner that feeds products of combustion thereto for upwardly directed flow to support the glass sheet strip.

In the preferred construction, the topside support device is made of a ceramic material that defines the first and second sets of openings. As disclosed, the topside support device includes first and second sets of holes that respectively embody the first and second sets of openings. The ceramic material of the topside support device thus defines the first and second sets of holes that embody the first and second sets of openings.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
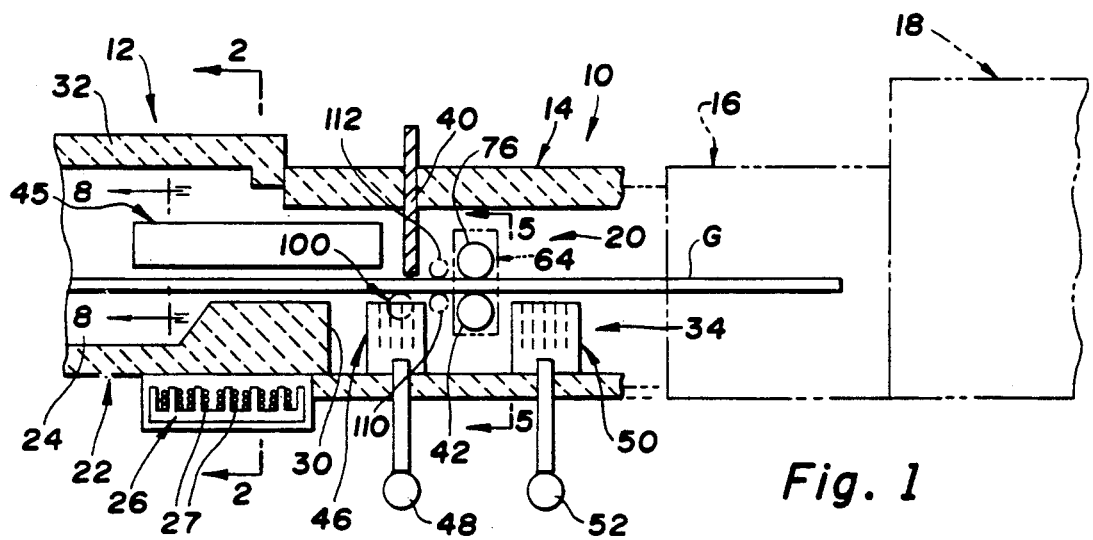
FIG. 1 is a schematic side elevational view taken partially in section to illustrate apparatus of the present invention for delivering a newly formed floating glass sheet strip from a molten metal bath to an annealing lehr.

With reference to FIG. 1 of the drawings, a glass sheet strip forming and processing system is generally indicated by 10 and is illustrated as including a forming station 12 for forming a hot glass sheet strip G, a delivery station 14 for delivering the glass sheet strip, a trimming station 16 for trimming the hot edges of the glass sheet strip, and an annealing lehr 18 where the hot glass sheet strip is annealed. As is hereinafter more fully described, the deliver station 14 includes apparatus 20 constructed in accordance with the present invention to provide delivery of the glass sheet strip G.

Figure 2:
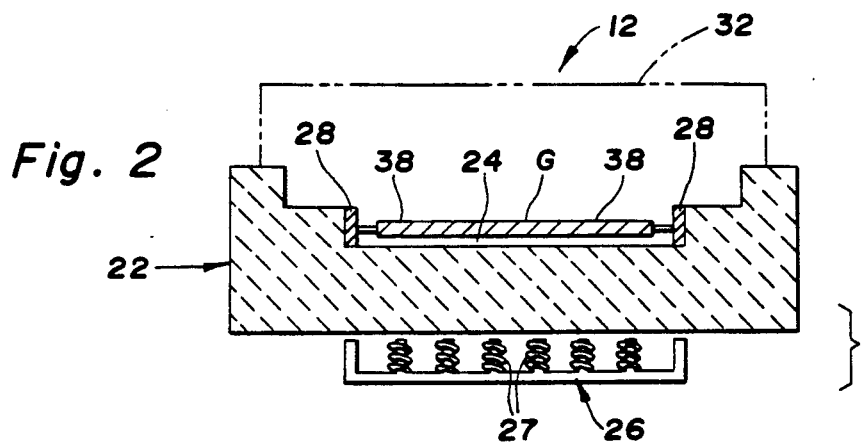
FIG. 2 is a cross-sectional view through the bath container with which the apparatus is utilized and illustrates the manner in which an electromagnetic inductor is incorporated to prevent the molten metal bath from spilling out of the bath container.

Forming station 12 illustrated in FIG. 1 includes a bath container 22 for a molten metal bath 24 on which the glass sheet strip G is floated just after being formed in any conventional fashion. A linear induction motor 26 of the bath container includes coils 27 for providing an electromagnetic force that prevents the molten metal bath 24 from spilling over the extremity 30 of the bath container where the glass sheet strip G is delivered while nevertheless permitting the glass sheet strip to be delivered horizontally. As illustrated, the linear induction motor 26 is located below the molten metal bath 24; however, it is also possible to position the linear induction motor above the molten metal bath such that it is thus located above the delivered glass sheet strip G. Furthermore, as illustrated in FIG. 2, the bath container 22 has electrically conductive side walls 28 so as to provide a uniform distribution of the electromagnetic force applied to the molten metal bath without any drop-off adjacent the side walls which would allow the molten metal bath to spill out of the bath container at the extremity 30 shown in FIG. 1. As is hereinafter more fully described, the molten metal bath 24 is preferably tin and the bath container 22 is made of a suitable refractory material and preferably has an upper housing 32 above the bath 24 and the floated glass sheet strip G supported by the bath.

Figure 3:
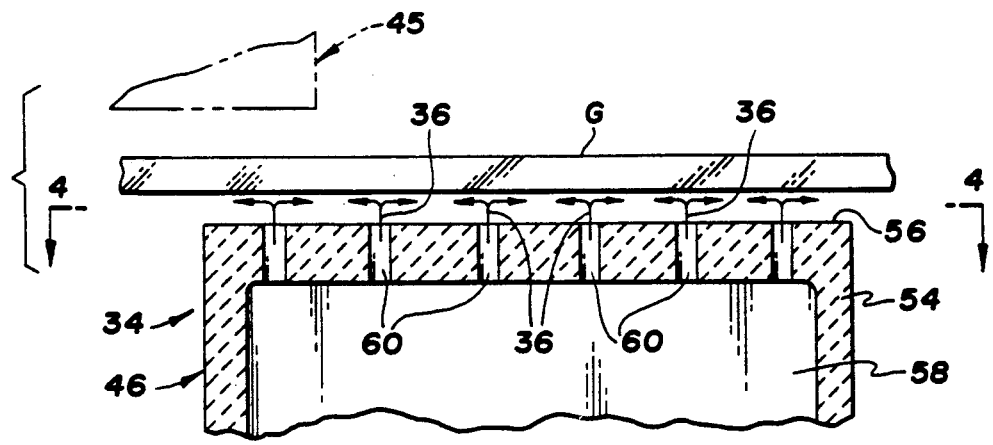
FIG. 3 is a sectional view taken in the same direction as FIG. 1 through a manifold of a gas support of the apparatus to illustrate the manner in which the glass sheet strip is initially supported from below after being delivered from the molten metal bath.

As illustrated by combined reference to FIGS. 1 and 3, the apparatus 20 of this invention preferably includes a gas support 34 for supporting the horizontally delivered glass sheet strip G by upwardly directed pressurized gas that is illustrated by arrows 36 in FIG. 3. This upwardly directed pressurized gas is delivered to the glass sheet strip G between its lateral edge portions 38 (FIG. 2) at a location immediately adjacent the bath container extremity 30 shown in FIG. 1 where the glass sheet strip is delivered horizontally from the molten metal bath 24. A wall or curtain 40 is located above the gas support 34 at this location to prevent entry of contaminated air or other gas into the upper housing 32 of the bath container.

As illustrated in FIG. 1, the apparatus 20 of this invention also preferably includes a drive roll 42 located downstream from the molten metal bath 24. This drive roll 42 as illustrated by additional reference to FIG. 6 has a two-piece construction including spaced drive portions 44 that rotatively drive the lateral edge portions 38 of the glass sheet strip without the drive roll engaging the strip between the spaced drive portions.

As shown by combined reference to FIGS. 1 and 3, the apparatus 20 of the invention includes a topside support device 45 that is located above the molten metal bath 24 and as is hereinafter more fully described has a downwardly facing surface including a first set of openings through which a vacuum is drawn to support the glass sheet strip G as well as having a second set of openings through which pressurized gas is supplied to space the glass sheet strip from the downwardly facing surface. As such, the vacuum drawn and the pressurized gas cooperatively support the glass sheet strip without direct contact with the downwardly facing surface for horizontal delivery from the molten metal bath.

As previously mentioned, the bath container 22 with which the apparatus 20 is utilized includes an upper housing 32 that encloses the molten metal bath 24 which is most preferably tin. Furthermore, the gas support 34 includes a first manifold 46 having an inert gas supply 48 for supplying upwardly directed inert gas that supports the glass sheet strip G adjacent the bath container 22 while supplying inert gas to the upper housing 32 of the bath container in order to prevent forming of tin oxides or dross at the upper surface of the bath. Furthermore, the gas support 34 also preferably includes a second manifold 50 for supplying upwardly directed pressurized gas that supports the glass sheet strip downstream from the first manifold 46.

Figure 4:
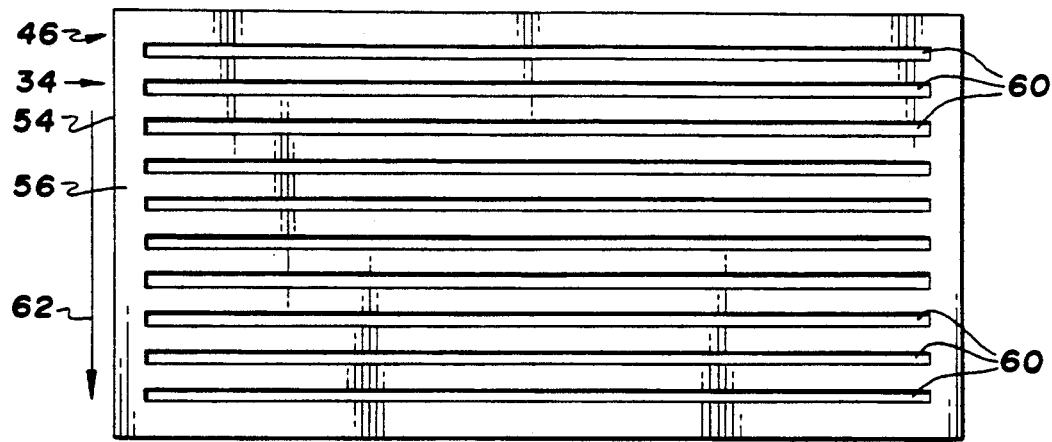
FIG. 4 is a top plan view taken along the direction of line 4—4 in FIG. 3 to further illustrate the construction of the manifold of the gas support.

In the preferred construction illustrated in FIG. 1, the inert gas supply 48 feeds hot nitrogen, which may also be mixed with hydrogen, to the first manifold 46 so as to provide an inert atmosphere within the upper bath container housing 32 in order to prevent the formation of tin oxides or dross at the surface of the molten metal bath 24. Furthermore, the second manifold 50 preferably includes a gas burner 52 that feeds pressurized products of combustion thereto for upwardly directed flow from the second manifold to support the glass sheet strip G downstream from the first manifold 46. The first manifold 46 as shown in FIG. 3 includes a manifold member 54 having an upper surface 56 and a pressurized gas plenum 58 that is communicated through openings 60 to supply the upwardly directed pressurized gas as illustrated by arrows 36. As shown in FIG. 4, the manifold openings 60 have elongated slit shapes that extend transversely with respect to the direction of delivery of the glass sheet strip as illustrated by arrow 62.

The second manifold 50 has a construction as disclosed by the U.S. Pat. No. 5,078,775 of Maltby et al, the entire disclosure of which is hereby incorporated by reference. More specifically, the manifold 50 has both supply and exhaust slots whose elongated shapes extend transversely to the direction of conveyance in an alternating relationship to each other. The products of combustion from gas burner 52 are fed to the manifold 50 and mixed with gas received from the exhaust slots for flow to the supply slots, such that a recirculating flow takes place as described in the aforementioned Maltby, Jr. patent which has been herein incorporated by reference.

As shown in FIGS. 1 and 5 through 7, the apparatus 20 also includes a pair of supports 64 for adjustably supporting the drive portions 44 of the drive roll 42. More specifically, the ends 66 of the drive rolls are rotatably supported by the associated supports 64 and rotational driving is provided through suitable gearing in one or both of the supports so as to rotatively drive the drive roll 42. Each support 64 also includes a vertical adjuster 72 that permits vertical adjustment of the plane of conveyance of the glass sheet strip on the spaced drive portion 44 of the drive roll 42. This vertical adjuster 72 is preferably of the threading type as illustrated.

Figure 5:
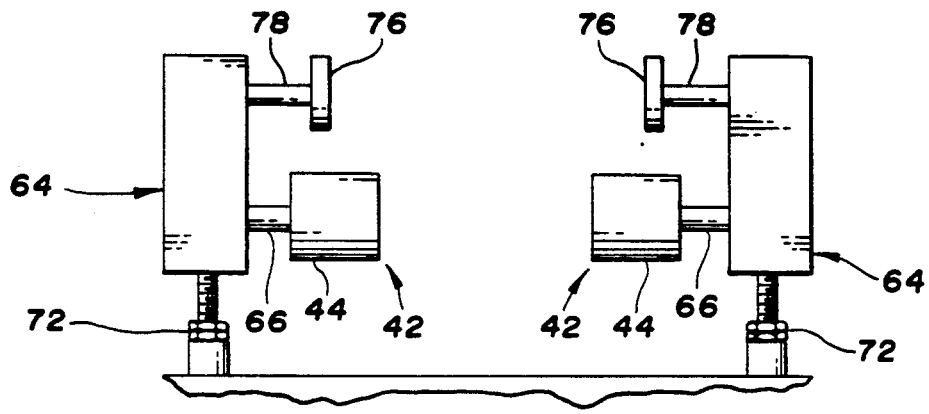
FIG. 5 is an elevational view taken along the direction of line 5—5 in FIG. 1 to illustrate the construction of a drive roll of the apparatus with the drive roll illustrated during start-up operation.
Figure 6:
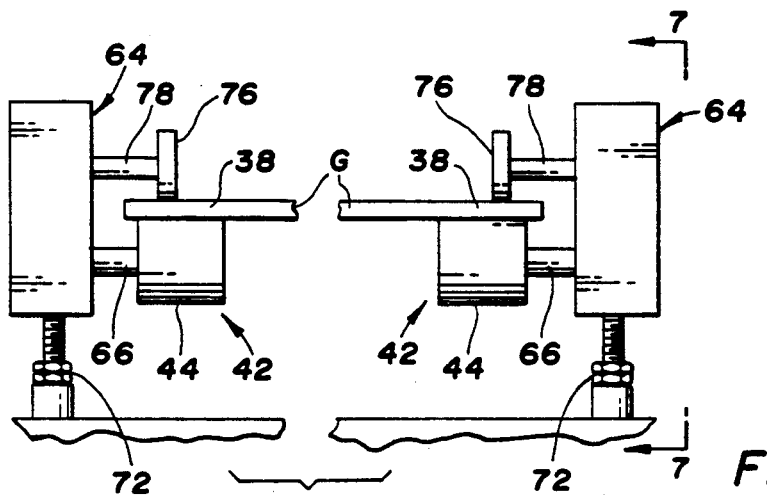
FIG. 6 is an elevational view similar to FIG. 5 showing the drive roll during steady state operation.
Figure 7:
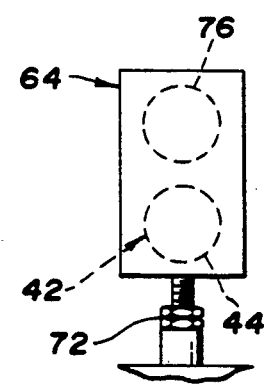
FIG. 7 is an elevational view taken along the direction of line 7—7 in FIG. 6 to illustrate the construction of a vertical adjuster for a drive roll support.

As illustrated in FIGS. 6 and 7, the apparatus 20 also preferably includes a pair of pinch rolls 76 respectively located above the drive portions 44 of the drive roll 42 to engage with the upper surfaces of the lateral edge portions 38 of the glass sheet strip G. Each of these pinch rolls 76 is rotatively mounted and driven by a suitable shaft 78 that extends from the associated support 64. These shafts 78 are mounted by the support 64 so as to be movable upwardly as illustrated in FIG. 5 during the start-up operation in order to permit the glass sheet strip G to spread laterally for the steady state operation, and the pinch rolls 78 are then moved downwardly to the position of FIG. 6 to engage the upper surfaces of the lateral edge portions 38 for the rotational driving in cooperation with the drive portions 44 of the drive roll 42.

Figure 8:
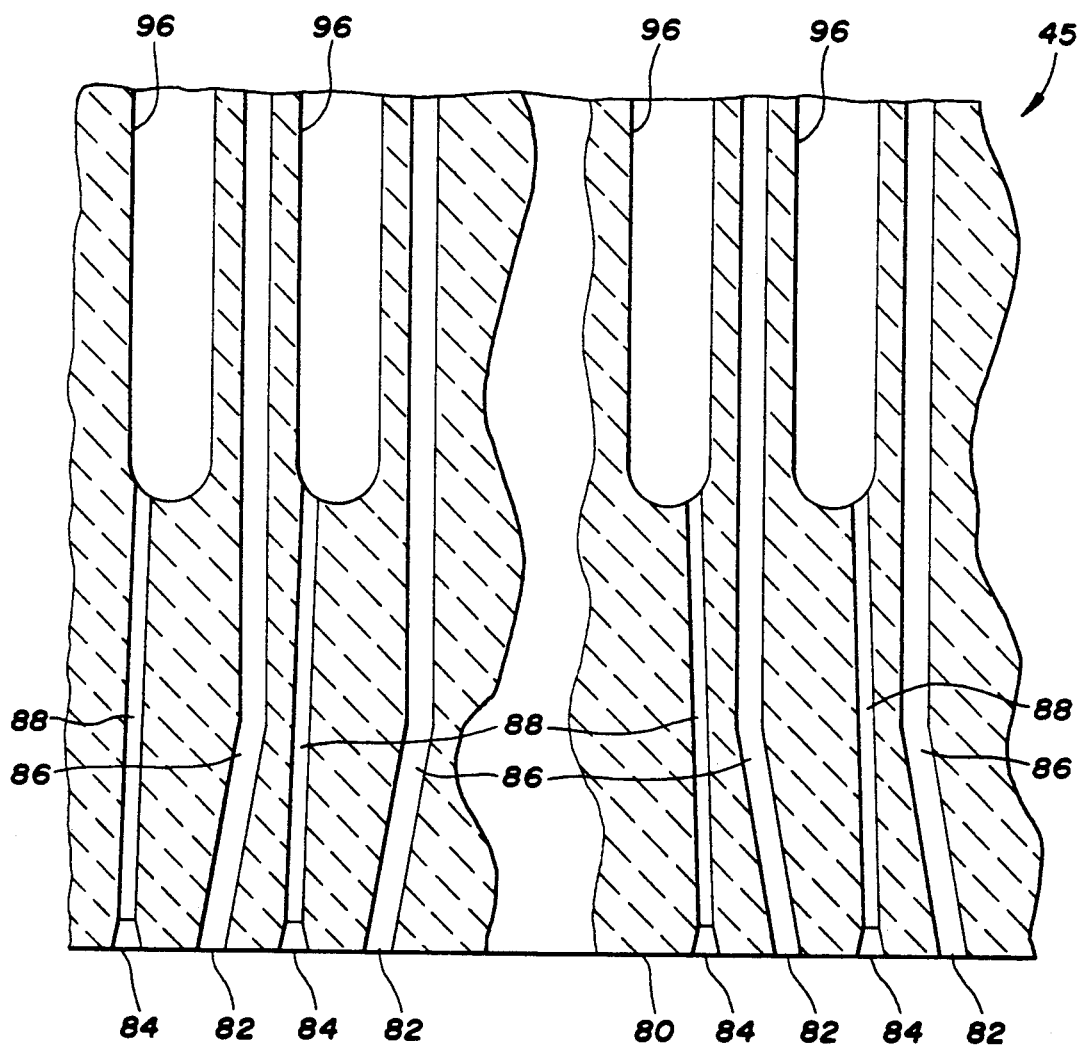
FIG. 8 is a sectional view taken along the direction of line 8—8 in FIG. to illustrate the construction of the topside support device constructed in accordance with the present invention.

As illustrated in FIG. 8, the topside support device 45 previously described has its downwardly facing surface identified by 80. This downwardly facing surface 80 has its first set of openings through which a vacuum is drawn identified by 82 and has its second set of openings through which pressurized gas is supplied identified by 84. More specifically, the topside support device 45 is disclosed as being made of a ceramic material that defines the first and second sets of openings 82 and 84 and is preferably made as cast ceramic of sinter bonded fused silica particles so as to be thermally stable. As disclosed, the topside support device 45 includes first and second sets of holes 86 and 88 that respectively embody the first and second sets of openings 82 and 84. It will be noted that the holes defining the second set of openings 84 have lower flared shapes through which the pressurized gas is diffused outwardly.

Figure 9:
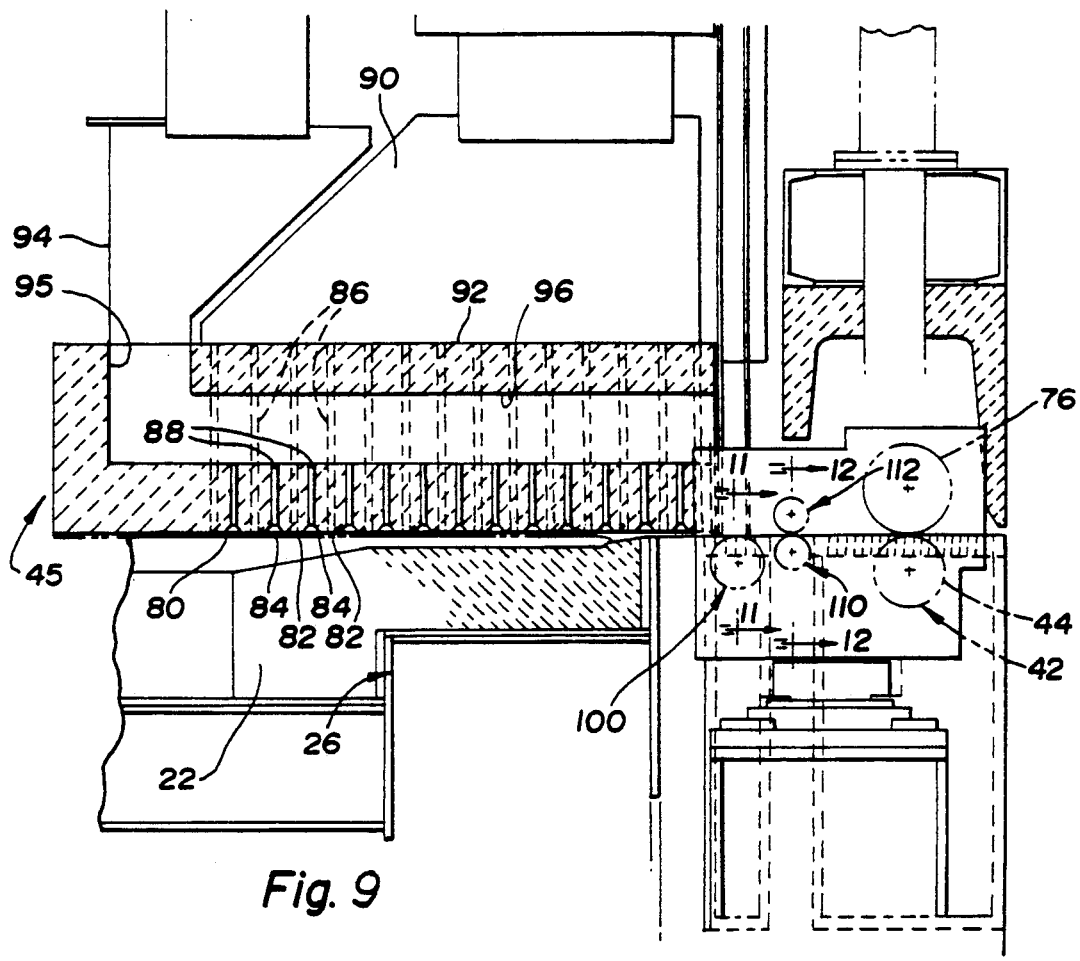
FIG. 9 is a sectional view taken generally in the same direction as FIG. 1 to further illustrate the processing system.

A first manifold 90 illustrated in FIG. 9 is communicated with the topside support device 45 at an upper surface 92 thereof to which the first set of holes 86 extend so as to thus draw the vacuum at the first set of openings 82 as previously described. A second manifold 94 is communicated through a passage 95 with passages 96 in the topside support device for communication with the second set of holes 88 and thus also with the second set of openings 84 in order to provide the supply of pressurized gas that is fed downwardly to space the glass sheet strip G from the downwardly facing surface 80 and to thereby cooperate with the vacuum in supporting the strip for horizontal movement from the molten bath 24 as previously described. The passages 96 extend longitudinally along the direction of movement of the glass sheet strip. As shown in FIG. 8, the first set of holes 86 extend vertically between the longitudinal passages 96 while the second set of holes 88 extend downwardly from the longitudinal passages 96. Furthermore, the first and second sets of holes 86 and 88 are positioned and inclined in opposite directions to provide a pattern of vacuum and pressurized gas openings that alternate along the direction of conveyance so as not to deform the glass sheet strip during the support provided thereto by the vacuum drawn and the pressurized gas supplied.

Figure 11:
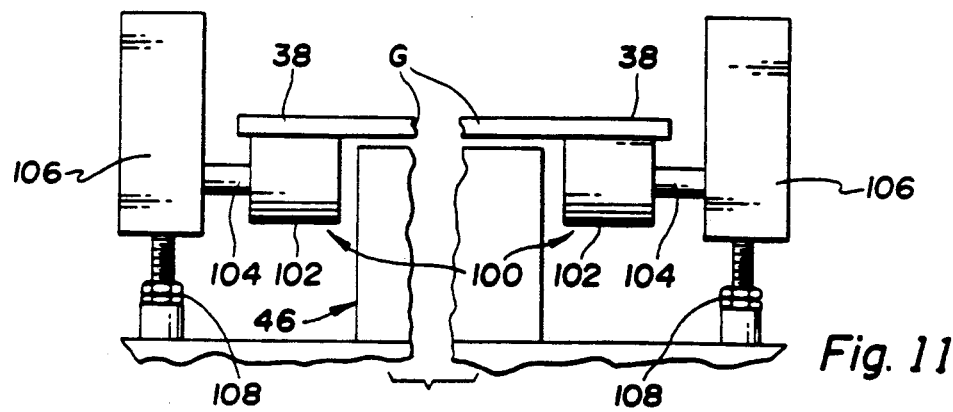
FIG. 11 is a view taken along the direction of line 11—11 in FIG. 9 to illustrate spaced drive portions that rotatively drive the opposite lateral edges of the glass sheet strip on opposite sides of a gas support immediately adjacent the molten metal bath.

In addition to the spaced drive portions 44 of the drive roll 42 and the pinch roll 76 as illustrated in FIG. 9 and previously described, the apparatus is also disclosed as including a drive roll 100 of a two-piece construction having as illustrated in FIG. 11 a pair of spaced drive portions 102 located on opposite sides of the first manifold 46 to support the opposite lateral edge portions 38 of the glass sheet strip G and thereby cooperate with this first manifold which supplies upwardly directed gas in supporting the glass sheet strip. These spaced drive portions 102 are respectively supported by shafts 104 that are rotatively supported and driven by a pair of adjustable supports 106 that provide the rotational driving like the adjustable supports previously described in connection with FIGS. 5–7. Each of these adjustable supports 106 is mounted by a vertical adjuster 108 preferably of the threading type for providing the proper elevation of the glass sheet strip on the spaced drive portions 102 with respect to the manifold 46.

Figure 12:
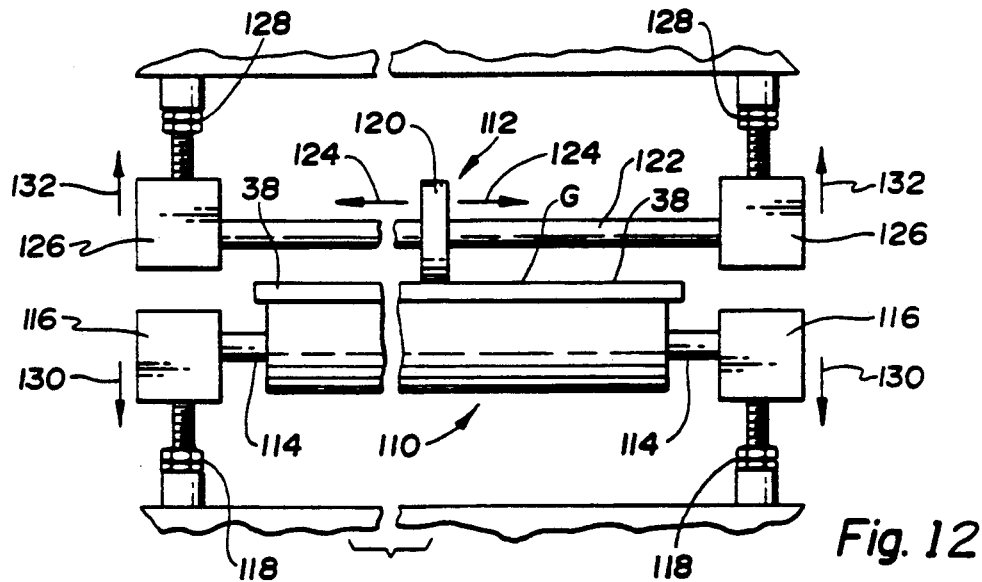
FIG. 12 is taken along the direction of line 12—12 in FIG. 9 and illustrates the construction of lower and upper start-up rolls that are utilized during the commencement of glass sheet forming.

As illustrated by combined reference to FIGS. 9 and 12, the apparatus also is disclosed as including lower and upper start-up rolls 110 and 112, respectively. The lower start-up roll 110 is supported by a pair of shafts 114 which are respectively driven by a pair of adjustable supports 116 like the adjustable supports previously described. Vertical adjusters 118 which are preferably of the threading type support the adjustable supports 116 at the proper elevation during start-up operation. The upper start-up roll 112 includes a round disc 120 that engages the central portion of the strip and is movable along a shaft 122 as shown by arrows 124 so as to be able to engage the glass sheet strip during start-up operation at any lateral position where the strip is located prior to expanding laterally to its full width upon reaching steady state operation. The opposite ends of the shaft 122 are supported by a pair of adjustable supports 126 which are respectively mounted by a pair of vertical adjusters 128 that are also preferably of the threading type. After the start-up operation, the lower start-up roll 110 is moved downwardly by the vertical adjusters 118 as shown by arrows 130 and the upper start-up roll 112 is moved upwardly by the vertical adjusters 128 as shown by arrows 132 such that there is no longer any contact by the start-up rolls with the glass sheet strip G during steady state operation.

Figure 10:
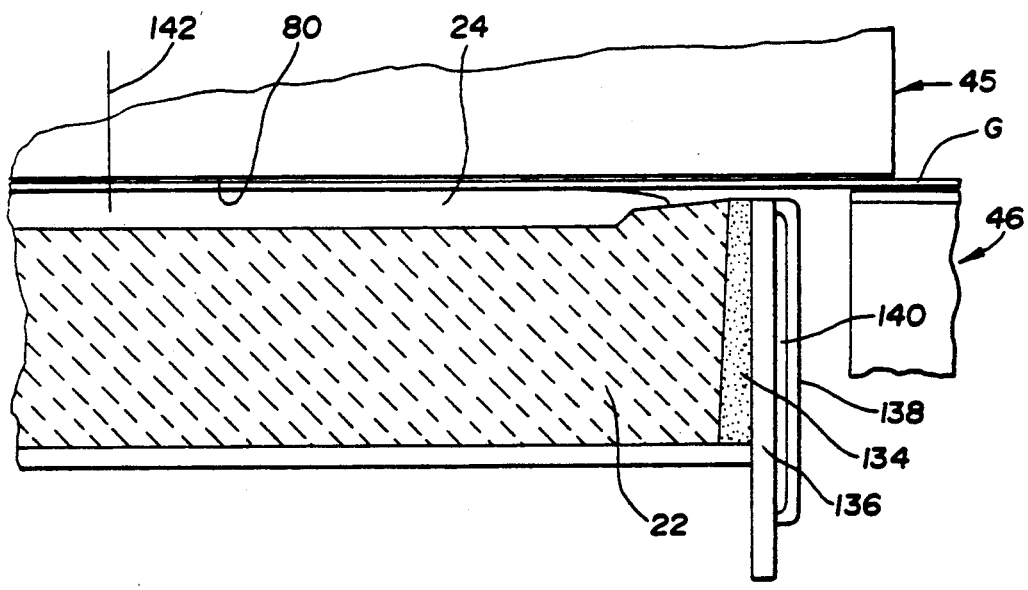
FIG. 10 is an enlarged view of a portion of FIG. 9 for more clearly illustrating the construction involved.

As illustrated in FIG. 10, the bath container 22 is made of a ceramic material and has a delivery end including a suitable high temperature insulation 134 with a somewhat greater resiliency than the ceramic material as well as including a steel end plate 136 and a manifold 138 that defines a cooling passage 140 through which a liquid coolant such as water is circulated. Upstream from the delivery end of the bath container 22, at a location identified by the vertical reference line 142, the upper surface of the molten metal bath 24 begins to incline downwardly. From that location toward the right, the topside support device 45 carries a certain portion of the weight of the glass sheet strip G to an extent that increases until the entire weight of the glass sheet strip is supported prior to being supported by the lower manifold 46 previously described. The topside support device thus functions to ensure a more planar conveyance of the glass sheet strip G throughout its extent of travel.

It should be appreciated that, while the apparatus is disclosed as delivering the glass sheet strip virtually horizontally from the molten metal bath through the use of the linear induction motor, it is also possible to utilize the topside support device 45 to deliver the glass sheet strip with some vertical movement so that there is no need for a linear induction motor. In such case, the downwardly facing surface 80 of the topside support device 45 will be inclined upwardly with a curved and/or flat shape to deliver the glass sheet strip from the molten metal bath 24.

While the best mode for carrying out the invention has been described in detail, those familiar with the art to which this invention relates will recognize various alternative designs and embodiments for practicing the invention as defined by the following claims.

What is claimed is:

1. In a glass sheet forming system including a bath container for containing a molten metal bath on which a newly formed glass sheet strip is floated, apparatus for delivering the newly formed glass sheet strip from the bath container, comprising:
a topside support device located above the molten metal bath and having a downwardly facing surface including a first set of openings through which a vacuum is drawn to support the glass sheet strip, and the downwardly facing surface of the topside support device having a second set of openings through which pressurized gas is supplied to space the glass sheet strip from the downwardly facing surface such that the vacuum drawn and pressurized gas cooperatively support the glass sheet strip without direct contact therewith for delivery from the molten metal bath.

2. Apparatus as in claim 1 which is utilized with a forming system whose bath container includes a linear induction motor that permits the glass sheet strip to move horizontally from the molten metal bath without the bath overflowing the bath container.

3. Apparatus as in claim 1 further including a gas support for supporting the horizontally delivered glass sheet strip by upwardly directed pressurized gas delivered between lateral edge portions of the strip at a location immediately adjacent the bath container.

4. Apparatus as in claim 3 which is utilized with a bath container including an upper housing that encloses the molten metal bath which is tin, the gas support including a first manifold having an inert gas supply for supplying an upwardly directed inert gas that supports the glass sheet strip adjacent the bath container while supplying inert gas to the upper housing of the bath container in order to prevent forming of tin oxides, and the gas support including a second manifold for supplying upwardly directed pressurized gas that supports the glass sheet strip downstream from the first manifold.

5. Apparatus as in claim 4 wherein the inert gas supply feeds nitrogen to the first manifold.

6. Apparatus as in claim 4 wherein the second manifold includes a gas burner that feeds products of combustion thereto for upward directed flow to support the glass sheet strip.

7. Apparatus as in claim 1 further including a drive means located downstream from the molten metal bath and operable to move the glass sheet strip out of the bath container.

8. Apparatus as in claim 7 wherein the drive means comprises a drive roll having spaced drive portions that rotatively drive lateral edge portions of the glass sheet strip.

9. Apparatus as in claim 1 wherein the topside support device is made of a ceramic material that defines the first and second sets of openings.

10. Apparatus as in claim wherein the topside support device includes first and second sets of holes that respectively embody the first and second sets of openings.

11. Apparatus as in claim 10 wherein the topside support device is made of a ceramic material that defines the holes embodying the openings.

12. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:
a topside support device located above the molten metal bath and having a downwardly facing surface including a first set of openings through which a vacuum is drawn to support the glass sheet strip, and the downwardly facing surface of the topside support device having a second set of openings through which pressurized gas is supplied to space the glass sheet strip from the downwardly facing surface such that the vacuum drawn and pressurized gas cooperatively support the glass sheet strip without direct contact therewith for horizontal delivery from the molten metal bath; and a gas support including a manifold and an inert gas supply that feeds the manifold to deliver an upwardly directed pressurized inert gas that supports the horizontally delivered glass sheet strip between lateral edge portions of the strip at a location immediately adjacent the bath container, and the inert gas being supplied from the manifold into the upper housing of the bath container to prevent contamination of the molten metal bath.

13. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:

a topside support device located above the molten metal bath and having a downwardly facing surface including a first set of openings through which a vacuum is drawn to support the glass sheet strip, and the downwardly facing surface of the topside support device having a second set of openings through which pressurized gas is supplied to space the glass sheet strip from the downwardly facing surface such that the vacuum drawn and pressurized gas cooperatively support the glass sheet strip without direct contact therewith for horizontal delivery from the molten metal bath;

a gas support including a first manifold and an inert gas supply that feeds the first manifold to deliver an upwardly directed pressurized inert gas that supports the horizontally delivered glass sheet strip between lateral edge portions of the strip at a location immediately adjacent the bath container, the inert gas being supplied from the manifold into the upper housing of the bath container to prevent contamination of the molten metal bath, and the gas support also including a second manifold located downstream from the first manifold and having a gas burner whose products of combustion are pressurized and fed to the second manifold for upwardly directed flow therefrom to support the glass sheet strip downstream from the first manifold; and drive means located downstream from the molten metal bath and having spaced drive portions that rotatively drive the lateral edge portions of the glass sheet strip to move the glass sheet strip out of the molten metal bath.

14. In a glass sheet forming system including a bath container for containing a molten metal bath on which a newly formed glass sheet strip is floated, the bath container having an upper housing and including a linear induction motor that permits the glass sheet strip to move horizontally from the molten metal bath without the bath overflowing the bath container, apparatus for delivering the newly formed glass sheet strip from the bath container, comprising:

a topside support device located above the molten metal bath and having a downwardly facing surface including a first set of openings through which a vacuum is drawn to support the glass sheet strip, and the downwardly facing surface of the topside support device having a second set of openings through which pressurized gas is supplied to space the glass sheet strip from the downwardly facing surface such that the vacuum drawn and pressurized gas cooperatively support the glass sheet strip without direct contact therewith for horizontal delivery from the molten metal bath;

a gas support including a first manifold and an inert gas supply that feeds the first manifold to deliver an upwardly directed pressurized inert gas that supports the horizontally delivered glass sheet strip between lateral edge portions of the strip at a location immediately adjacent the bath container, the inert gas being supplied from the manifold into the upper housing of the bath container to prevent contamination of the molten metal bath, and the gas support also including a second manifold located downstream from the first manifold and having a gas burner whose products of combustion are pressurized and fed to the second manifold for upwardly directed flow therefrom to support the glass sheet strip downstream from the first manifold; and drive means including a drive roll located downstream from the molten metal bath and having spaced drive portions that rotatively drive the lateral edge portions of the glass sheet strip without the drive roll engaging the strip between the spaced drive portions, and the drive means also including a pair of pinch rolls respectively mounted above the spaced drive portions of the drive roll to engage the lateral edge portions of the glass sheet strip.

* * * * *

UNITED STATES PATENT AND TRADEMARK OFFICE
CERTIFICATE OF CORRECTION

PATENT NO. : 5,156,664

DATED : October 20, 1992

INVENTOR(S) : Robert E. Maltby, Jr. et al.

It is certified that error appears in the above-identified patent and that said Letters Patent is hereby corrected as shown below:

Column 8, Line 42, Claim 10 (Appln. Page 17, Line 25, Claim 10), after "claim" insert --1--.

Signed and Sealed this

Twelfth Day of October, 1993

Attest:

Attesting Officer

BRUCE LEHMAN

Commissioner of Patents and Trademarks